United States Patent
Feigel et al.

(10) Patent No.: US 10,137,877 B2
(45) Date of Patent: Nov. 27, 2018

(54) BRAKE SYSTEM FOR MOTOR VEHICLES

(71) Applicant: Continental Teves AG & Co. oHG, Frankfurt (DE)

(72) Inventors: Hans-Jörg Feigel, Rosbach (DE); Harald Biller, Eschborn (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 38 days.

(21) Appl. No.: 14/770,859

(22) PCT Filed: Feb. 17, 2014

(86) PCT No.: PCT/EP2014/053035
§ 371 (c)(1),
(2) Date: Aug. 27, 2015

(87) PCT Pub. No.: WO2014/131645
PCT Pub. Date: Sep. 4, 2014

(65) Prior Publication Data
US 2016/0023644 A1    Jan. 28, 2016

(30) Foreign Application Priority Data

Feb. 27, 2013 (DE) .......................... 10 2013 203 224
Feb. 27, 2013 (DE) .......................... 10 2013 203 225
Dec. 13, 2013 (DE) .......................... 10 2013 225 809

(51) Int. Cl.
*B60T 13/74* (2006.01)
*B60T 13/14* (2006.01)
(Continued)

(52) U.S. Cl.
CPC .......... *B60T 13/147* (2013.01); *B60T 8/4081* (2013.01); *B60T 13/686* (2013.01)

(58) Field of Classification Search
CPC ........ B60T 7/042; B60T 8/4077; B60T 8/441; B60T 8/4072; B60T 8/4081; B60T 13/686
(Continued)

(56) References Cited

U.S. PATENT DOCUMENTS

2004/0222695 A1*  11/2004  Miyazaki .............. B60T 8/4081
                                                303/155
2007/0152500 A1*   7/2007  Wakabayashi ............ B60T 7/22
                                                303/155
(Continued)

FOREIGN PATENT DOCUMENTS

DE    10 2011 081 461 A1    1/2012
DE    10 2012 202 645 A1   10/2012
(Continued)

OTHER PUBLICATIONS

Linkenbach et al (DE 102011081461 A1), Translation.*
PCT International Search Report—dated Apr. 2, 2014.
German Examination Report—dated Sep. 18, 2014.

*Primary Examiner* — Bradley T King
*Assistant Examiner* — Stephen M Bowes
(74) *Attorney, Agent, or Firm* — Brinks Gilson & Lione (57) ABSTRACT

A brake system for motor vehicles, having a brake master cylinder actuated by a brake pedal with at least one first pressure chamber. The brake master cylinder communicating with wheel brakes; and a hydraulic fluid storage container. A pressure balancing connection connects to the fluid storage container. A first electrically controllable pressure supply device communicating with the wheel brakes. A pressure regulating valve arrangement for regulated wheel brake pressure. A first electronic control and regulating unit actuated the first pressure supply device and the pressure
(Continued)

regulating valve arrangement. A second electrically controllable pressure supply device connected to the brake master cylinder and having a pressure outlet connection paired with a second electronic control and regulating unit. The first and the second pressure supply device generate braking pressures independently of each other, and the pressure outlet connection is connected to the pressure balancing connection.

14 Claims, 6 Drawing Sheets

(51) Int. Cl.
  *B60T 8/40* (2006.01)
  *B60T 13/68* (2006.01)

(58) Field of Classification Search
  USPC .................................................. 303/DIG. 9
  See application file for complete search history.

(56) References Cited

U.S. PATENT DOCUMENTS

| | | | |
|---|---|---|---|
| 2008/0257670 A1* | 10/2008 | Drumm | B60T 8/4077 188/358 |
| 2008/0258546 A1* | 10/2008 | Drumm | B60T 7/042 303/115.4 |
| 2009/0079259 A1* | 3/2009 | Iwasaki | B60T 1/10 303/146 |
| 2012/0053803 A1* | 3/2012 | Ueno | B60T 8/1708 701/70 |
| 2013/0147259 A1* | 6/2013 | Linkenbach | B60T 7/042 303/14 |
| 2014/0203626 A1* | 7/2014 | Biller | B60T 8/4081 303/10 |

FOREIGN PATENT DOCUMENTS

| | | | | |
|---|---|---|---|---|
| WO | WO 2009/083216 A2 | 7/2009 | | |
| WO | WO 2010/006998 A1 | 1/2010 | | |
| WO | WO 2011/029812 A1 | 3/2011 | | |
| WO | WO 2012143313 A1 * | 10/2012 | | B60T 8/4081 |

* cited by examiner

BRAKE SYSTEM FOR MOTOR VEHICLES

CROSS REFERENCE TO RELATED APPLICATIONS

This application claims priority to German Patent Application Nos. 10 2013 203 224.2, filed Feb. 27, 2013; 10 2013 203 225.0, filed Feb. 27, 2013; 10 2013 225 809.7, filed Dec. 13, 2013; and PCT/EP2014/053035, filed Feb. 17, 2014.

FIELD OF THE INVENTION

The invention concerns a brake system for motor vehicles.

BACKGROUND

In automotive technology, "brake-by-wire" brake systems are becoming increasingly common. Such brake systems often comprise, as well as a brake master cylinder which can be actuated by the vehicle driver, an electrically controllable pressurization device by means of which the wheel brake can be actuated in "brake-by-wire" operating mode.

International patent application WO 2011/029812 A1 discloses a "brake-by-wire" brake system with a brake pedal-actuated brake master cylinder, a travel simulator and a pressurization device. The wheel brakes are pressurized by the pressurization device in the "brake-by-wire" operating mode. In fall-back operating mode, the wheel brakes are pressurized by means of the brake master cylinder which is actuatable by the brake pedal.

DE 10 2011 081 461 A1 discloses a brake system for motor vehicles which comprises a brake pedal-actuatable brake master cylinder which is separably connected to the wheel brakes of the motor vehicle, an electrically controllable pressurization device which can be connected to the wheel brakes, a pressure regulating valve arrangement and an electrically controllable additional pressurization device. The primary piston of the brake master cylinder can be actuated by means of the additional pressurization device. For this the pressure output port of the additional pressurization device is connected to an intermediate space of the brake master cylinder which is delimited by the brake pedal-side surface of the primary piston of the brake master cylinder. The additional pressurization device is thus connected upstream of the brake master cylinder and creates a brake force amplification of an actuating force introduced by the driver via the brake pedal. It is not possible to feed (a volume of) pressure medium into the brake circuits or wheel brake circuits from the additional pressurization device.

It is an object of the present invention to propose a brake system with which the safety requirements of autonomous driving are fulfilled. Braking must be possible in the event of a fault even without actuation of the brake pedal by the driver.

This object is achieved by a brake system according to this invention.

SUMMARY AND INTRODUCTORY DESCRIPTION

The invention is based on the concept that a second electrically controllable pressurization device is provided with a pressure output port which is connected to the pressure balancing port of a pressure chamber of the brake master cylinder. In this way, in the event of fault in the first pressurization device, even without actuating the brake pedal, a volume of pressure medium can be fed into the associated brake circuit and pressure built up at the wheel brakes of the motor vehicle.

It is a further object of the present invention to provide an integrated braking system (one-box design) which ensures the availability of higher deceleration in fall-back mode. This object is also achieved by the brake system described herein.

The invention offers the advantage that on any arbitrary single fault of the brake system, braking of the vehicle is still possible without requiring the support of the driver.

It is a further advantage of the invention that, compared with the brake system known from WO 2011/029812 A1, no fundamental interventions in or changes to the basic architecture of the brake system are necessary. The brake system according to the invention can therefore be implemented at favorable cost.

A valve arrangement is preferably provided for blocking the connection between the pressure balancing port and the pressure medium storage container. Thus a pressure can be built up by means of the second pressurization device.

The valve arrangement can preferably be controlled by means of the second electronic control and regulating unit which is assigned to the second pressurization device for control purposes. Thus even on failure of the first control and regulating unit, pressure can be built up by the second pressurization device.

Preferably, the brake system is supplied with electrical energy by at least two independent energy supply devices, wherein a first electrical energy supply device supplies the first pressurization device and the first control and regulating unit, and a second electrical energy supply device supplies the second pressurization device and the second control and regulating unit. Particularly preferably, the first energy supply device also supplies electrical energy to the valves of the hydraulic module of the integrated brake system. Particularly preferably, the valve arrangement is also supplied with electrical energy by the second energy supply device.

Because of the separation of the on-board networks, the pressure built up by the second pressurization device can be reduced preferably via the valve arrangement.

The valve arrangement is preferably configured as an analog controllable valve, so that a measured pressure reduction and pressure regulation is possible.

For modular construction, the valve arrangement is preferably arranged in an assembly with the second pressurization device. Particularly preferably, the valve arrangement is supplied with electrical energy by the second control and regulating unit. Thus on failure of the energy supply to the integrated brake system, pressure can still be built up by the second pressurization device and the second control and regulating unit.

According to a preferred embodiment of the brake system, the brake master cylinder has a second pressure chamber to which a pressure sensor is connected, the output signal of which is supplied to the second electronic control and regulating unit. The pressure sensor is particularly preferably supplied with electrical energy by the second electronic control and regulating unit. In this way, even on failure of the first pressurization device or the first control and regulating unit, pressure regulation of the second pressurization device is possible.

Preferably, the second pressurization device is configured as a hydraulic module in which the pressure sensor is integrated.

Preferably, the brake master cylinder, the first pressurization device and the pressure regulating valve arrangement are combined in one assembly. Particularly preferably, the hydraulic module comprising the second pressurization device is also integrated in this assembly.

The first and the second electronic control and regulating units are preferably mechanically connected to the assembly.

According to a preferred refinement of the invention, the second pressurization device comprises the second electronic control and regulating unit. This allows a simple modular structure of the brake system.

For autonomous driving, preferably a third electronic control and regulating unit is provided which controls the task division between the first and second electronic control and regulating units. Particularly preferably, the third electronic control and regulating unit is connected via a first data connection to the first control and regulating unit, and via a second, advantageously independent, data connection to the second control and regulating unit. Advantageously, the first and second control and regulating units specify a nominal pressure value of the third control and regulating unit.

Preferably, pressure is built up by the first control and regulating unit and the first pressurization device when the third control and regulating unit detects that the first electronic control and regulating unit is capable of functioning. For this, particularly preferably, the first control and regulating unit transmits a status signal to the third control and regulating unit, indicating whether or not the first pressurization device and/or the first control and regulating unit is available.

According to a refinement of the invention, a brake pedal travel or brake pedal angle detection device is provided, the output signal of which is supplied to the second electronic control and regulating unit, and which is supplied with power by the second electronic control and regulating unit. Particularly preferably, the brake pedal travel or brake pedal angle detection device is provided in addition to a travel detection device which detects an actuation travel of a piston of the brake master cylinder. The output signal is advantageously supplied exclusively to the second electronic control and regulating unit.

Preferably, the output signal of the brake pedal travel or brake pedal angle detection device is taken into account for a pressure build-up by means of the second pressurization device.

Preferably, the first pressurization device is formed by a cylinder-piston arrangement, the piston of which can be actuated by an electromechanical actuator.

Preferably, the brake system comprises two brake circuits, wherein each brake circuit is connected to the brake master cylinder via a hydraulic connecting line with a preferably normally open isolating valve, and to the first pressurization device via a second hydraulic connecting line with an advantageously normally closed sequence valve.

Preferably, the brake system for motor vehicles can be controlled in so-called "brake-by-wire" operating mode both by the vehicle driver and independently of the vehicle driver, is preferably operated in "brake-by-wire" operating mode, and can be operated in at least one fall-back operating mode in which only operation by the vehicle driver is possible.

The brake system preferably comprises a pedal travel simulator which gives the vehicle driver a pleasant brake pedal sensation in the "brake-by-wire" operating mode. The pedal travel simulator is particularly preferably designed hydraulically and is or can be connected to the brake master cylinder. The pedal travel simulator is advantageously configured to be connectable and disconnectable by means of a simulator release valve.

The pressure regulating valve arrangement preferably comprises a normally open inlet valve and a normally closed outlet valve per wheel brake.

Further preferred embodiments of the invention arise from system description provided herein with reference to figures.

FURTHER DESCRIPTION OF THE INVENTION

Figure 1:
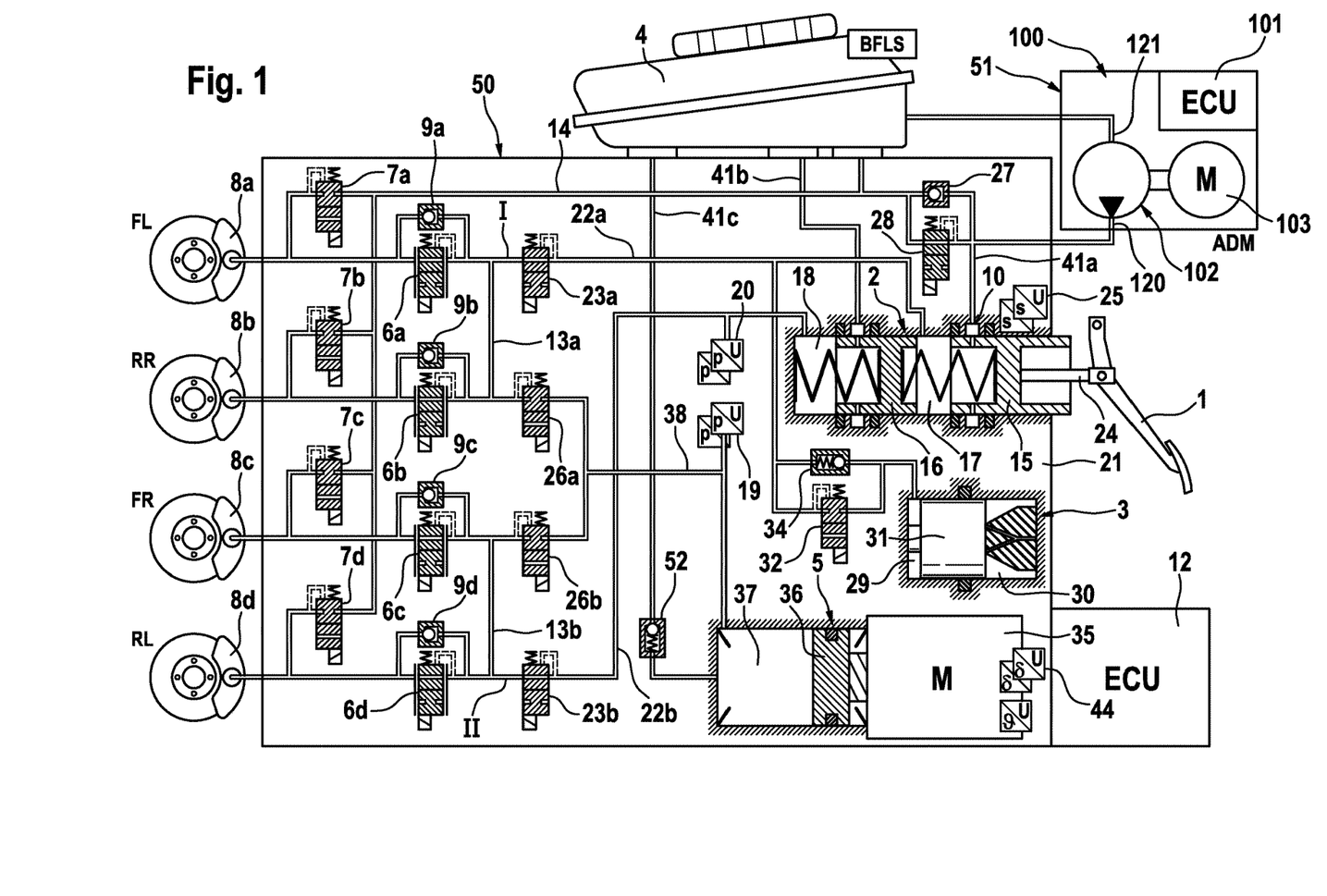
FIG. 1 shows a first exemplary embodiment of a brake system according to the invention.

FIG. 1 shows diagrammatically a first exemplary embodiment of a brake system according to the invention for motor vehicles. The brake system substantially includes a brake master cylinder 2 which can be actuated by means of an operating or brake pedal 1, a pedal travel simulator (simulation device) 3 co-operating with the brake master cylinder 2, a pressure medium storage container 4 under atmospheric pressure and assigned to the brake master cylinder 2, a first electrically controllable pressurization device 5, an electrically controllable pressure regulating valve arrangement, a first electronic control and regulating unit 12, a second electrically controllable pressurization device 100 with a second electronic control and regulating unit 101.

The pressure regulating valve arrangement includes for example, per wheel brake 8a-8d of a motor vehicle not shown, an inlet valve 6a-6d and an outlet valve 7a-7d which are connected together hydraulically in pairs via central connections and connected to the wheel brakes 8a-8d. The input connections of the inlet valves 6a-6d are supplied by means of brake circuit supply lines 13a, 13b with pressures which are derived, in a "brake-by-wire" operating mode, from a brake system pressure which is present in a system pressure line 38 connected to a pressure chamber 37 of the first electrically controllable pressurization device 5. A check valve 9a-9d opening towards the brake circuit supply lines 13a, 13b is connected in parallel to each inlet valve 6a-6d. In fall-back operating mode, the brake circuit supply lines 13a, 13b are pressurized via hydraulic lines 22a, 22b with the pressures of the pressure chambers 17, 18 of the brake master cylinder 2. The output ports of the outlet valves 7a-7d are connected to the pressure medium storage container 4 via a return line 14.

The brake master cylinder 2 has two pistons 15, 16 arranged behind each other in a housing 21 and delimiting the hydraulic pressure chambers 17, 18, which together with pistons 15, 16 form a dual-circuit brake master cylinder or tandem master cylinder. The pressure chambers 17, 18 are connected on one side to the pressure medium storage container 4 via radial bores formed in the pistons 15, 16 and corresponding pressure balancing lines 41a, 41b, wherein these may be blocked by a relative movement of the pistons 17, 18 in the housing 21, and on the other side by means of the hydraulic lines 22a, 22b to the abovementioned brake supply lines 13a, 13b via which the inlet valves 6a-6d are connected to the brake master cylinder 2.

In the pressure balancing line 41a connecting the pressure balancing port 10 of the pressure chamber 17 to the pressure medium storage container 4, a valve arrangement is provided for blocking the connection between the pressure balancing port 10 and the pressure medium storage container 4. The valve arrangement is formed for example by a parallel connection of a normally open (NO) diagnostic valve 28 with a check valve 27 closing towards the pressure medium storage container 4.

The diagnostic valve 28 is advantageously formed as an analog controllable valve (not shown in FIG. 1).

The pressure chambers 17, 18 receive return springs (not shown in detail) which position the pistons 15, 16 in the starting position when the brake master cylinder is not actuated. A piston rod 24 couples the pivot movement of the brake pedal 1 resulting from pedal actuation with the translational movement of the first (master cylinder) piston 15, the actuation travel of which is detected by a travel sensor 25, preferably configured redundantly. Thus the corresponding piston travel signal is a measure of the brake pedal actuation angle. It represents a braking desire of the vehicle driver.

An isolating valve 23a, 23b is arranged in each line portion 22a, 22b connected to the pressure chambers 17, 18, and is configured as an electrically actuatable, preferably normally open (NO) valve. The hydraulic connection between the pressure chambers 17, 18 and the brake circuit supply lines 13a, 13b may be blocked by the isolating valves 23a, 23b. A pressure sensor connected to the line portion 22b detects the pressure built up in the pressure chamber 18 by a displacement of the second piston 16.

According to the first exemplary embodiment, the wheel brakes 8a and 8b are assigned to the front left wheel (FL) and rear right wheel (RR) and connected to the first brake circuit I (13a). The wheel brakes 8c and 8d are assigned to the front right wheel (FR) and the rear left wheel (RL) and connected to the second brake circuit II (13b).

The pedal travel simulator 3 is hydraulically coupled to the brake master cylinder 2 and substantially a includes a simulator chamber 29, a simulator spring chamber 30 and a simulator piston 31 separating the two chambers 29, 30 from each other. The simulator piston 31 rests on the housing 21 via an elastic element arranged in the simulator spring chamber 30. The simulator chamber 29 can thus be connected by means of an electrically actuatable simulator release valve 32 to the first pressure chamber 17 of the tandem brake master cylinder 2. On application of a pedal force and when the simulator release valve 32 is activated, pressure medium flows from the brake master cylinder pressure chamber 17 into the simulator chamber 29. A check valve 34 arranged hydraulically parallel to the simulator release valve 32 allows largely unhindered back flow of the pressure medium, independently of the switching state of the simulator release valve 32, from the simulator chamber 29 to the brake master cylinder pressure chamber 17.

The first electrically controllable pressurization device 5 is configured as a hydraulic cylinder-piston arrangement or single circuit electrohydraulic actuator, the piston 36 of which can be actuated by an electric motor 35 (depicted diagrammatically) via the inter-connection of a rotation-translation gear mechanism, also depicted diagrammatically. The piston 36 delimits a pressure chamber 37 to which the system pressure line 38 is connected. The system pressure line 38 can be connected to the brake circuit supply lines 13a, 13b via a respective, electrically actuatable sequence valve 26a, 26b which is advantageously normally closed. Pressure medium can still be drawn into the pressure chamber 37 by the return of the piston 36 when the sequence valve 26a, 26b is closed, in that pressure medium can flow from the pressure medium storage container 4 into the actuator pressure chamber 37 via a line 41c with a feed valve 52 which is configured as a check valve opening in the direction of flow towards the actuator.

To detect a parameter characteristic of the position/situation of the piston 36 of the first pressurization device 5, a sensor 44 is present which for example is configured as a rotor position sensor serving to detect the rotor position of the electric motor 35. Other sensors are also conceivable, e.g. a travel sensor to detect the position/situation of the piston 36. On the basis of the parameter characteristic of the position/situation of the piston 36, it is possible to determine the pressure medium volume emitted from or received by the pressurization device 5.

To detect the brake system pressure P generated by the pressurization device 5, a pressure sensor 19 is provided which is preferably designed redundantly.

The first electronic control and regulating unit 12 preferably serves to control the pressurization device 5, the isolating valves 23a, 23b, the sequence valves 26a, 26b, the simulator release valve 32, and the inlet and outlet valves 6a-6d, 7a-7d.

The brake master cylinder 2, pedal travel simulator 3, pressurization device 5, valves 6a-6d, 9a-9d, 7a-7d, 23a, 23b, 26a, 26b, 27, 28, 32, 34, 52 and sensors 19, 20, 25 are preferably configured as a hydraulic module 50 which, together with the first control and regulating unit 12, is also described below as an integrated brake system.

The brake system furthermore includes a second electrically controllable pressurization device 100 with a second electronic control and regulating unit 101, which for example is configured as an autonomous module 51 (ADM: autonomous driving module). The pressure output port 120 of the second pressurization device 100 is connected via the pressure balancing line 41a to the pressure balancing port (pressure medium storage container port, reservoir port) 10 of the pressure chamber 17 of the brake master cylinder 2.

The suction port 121 of the pressurization device 100 is connected for example to the pressure medium storage container 4. Advantageously, the suction port is connected directly, i.e. without the interposition of a valve, to the pressure medium storage container 4.

Advantageously, the pressurization device 100 includes a pump 102 with an electric motor 103 to generate pressure. Such pumps have been known for some time as return pumps in conventional brake systems.

In a normal braking function of the brake system ("brake-by-wire" mode), a brake master cylinder 2, and hence the vehicle driver, is decoupled from the wheel brakes 8a-8d by the closed isolating valves 23a, 23b, and the brake circuit supply lines 13a, 13b are connected via the open sequence valves 26a, 26b to the pressurization device 5 which provides the system pressure for activating the wheel brakes 8a-8d. Simulation device 3 is switched on by the opened simulator release valve 32, so that the pressure medium volume expelled via actuation of the brake pedal 1 by the driver from the brake master cylinder 2 is received by the simulation device 3, and the simulation device 3 provides the conventional brake pedal feel for the driver.

In an unamplified fall-back operating mode of the brake system, e.g. on failure of the electrical energy supply to the entire brake system, simulation device 3 is switched off by the normally closed simulator release valve 32, and the pressurization device 5 is separated from the brake circuit supply lines 13a, 13b by the normally closed sequence valves 26a, 26b. The brake master cylinder 2 is connected to the brake circuit supply lines 13a, 13b via lines 22a, 22b with the normally open isolating valves 23a, 23b and hence to wheel brakes 8a-8d, so that the vehicle driver can build up pressure in the wheel brakes 8a-8d directly by actuating the brake pedal 1.

Figure 2:
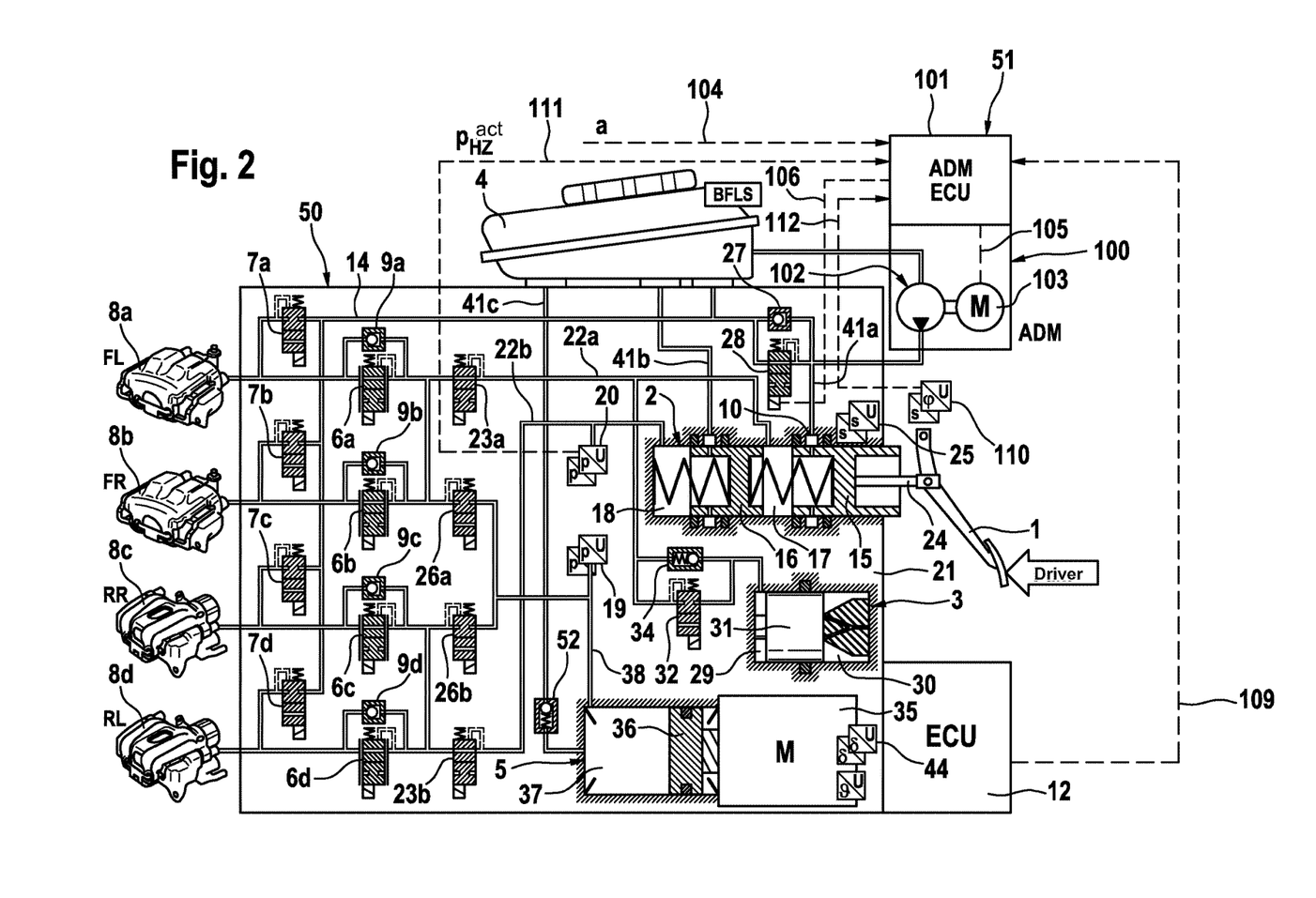
FIG. 2 shows a second exemplary embodiment of a brake system according to the invention.

FIG. 2 shows diagrammatically a second exemplary embodiment of a brake system for motor vehicles according to the invention which substantially corresponds to the first exemplary embodiment. Corresponding components carry the same reference numerals. In contrast to the first exemplary embodiment of FIG. 1, the wheel brakes 8a, 8b are assigned to the front left wheel (FL) and front right wheel (FR) and connected to the first brake circuit I (13a), and wheel brakes 8c and 8d are assigned to the rear right wheel (RR) and the rear left wheel (RL) and connected to the second brake circuit II (13b) (so-called black-white split).

An explanation of further operating modes of an exemplary brake system is given below with reference to FIG. 2, corresponding operating modes may however be implemented with the brake system shown in FIG. 1. To explain the further operating modes, additional different control lines, signal lines and communication connections are indicated diagrammatically by dotted lines in FIG. 2 and will be explained in more detail below.

The diagnostic valve 28 is controlled by the second electronic control and regulating unit 101, as indicated by the control line 106 in FIG. 2. Advantageously, the diagnostic valve 28 is also supplied with electrical energy, e.g. power, by the second electronic control and regulating unit 101.

The electric motor 103 of the pressurization device 100 is controlled by the second control and regulating unit 101 via the control line 105.

The signal (actual pressure $P^{act}_{HZ}$) of the pressure sensor 20 which is connected to the pressure chamber 18 of the brake master cylinder 2 is supplied to the second pressurization device 100 via a signal line 111 of the control and regulating unit 101.

In a first fall-back mode, e.g. on failure of the first pressurization device 5, the pressure is built up by means of the second pressurization device 100. For this, the control and regulating unit 101 controls i.e. closes the diagnostic valve 28, and the electric motor 103 drives the pump 102 so that a brake pressure can be set in lines 22a, 22b and hence in the wheel brakes 8a-8d.

To set the pressure, advantageously the signal (actual pressure $P^{act}_{HZ}$) of the pressure sensor 20 is evaluated, which is read by the control and regulating unit 101.

Instead of signal $P^{act}_{HZ}$ of pressure sensor 20, the control and regulating unit 101 may receive, via a communication connection 104, an actual deceleration signal or actual longitudinal acceleration signal $a^{act}$ of the vehicle. The actual deceleration signal $a^{act}$ can be used to set the pressure. This offers the advantage that no interface for the signal $P^{act}_{HZ}$ is required between the integrated brake circuit 50 and module 51 of the second pressurization device 100.

The actual deceleration signal $a^{act}$ may e.g. be supplied by a further control unit of the vehicle or obtained from the wheel speed sensors of the vehicle or taken from a surround sensor 107 (not shown in FIG. 2).

The second pressurization device 100 is also suitable for improving the behavior in fall-back mode in vehicles with greater volume absorption, or for making a fall-back mode possible (so-called second amplified fall-back mode). On failure of the integrated brake system (e.g. due to a fault in the pressurization device 5 or in the control and regulating unit 12), the second pressurization device 100 is controlled according to the brake pedal travel, in order to deliver further pressure medium volume to the wheel brake 8a-8d, in addition to the pressure medium volume expelled by the driver, in the sense of a volume amplifier to increase the pressure. The pressure is controlled by the driver. With small brake master cylinder diameters, even large vehicles can thus be braked with low pedal forces.

The signal of the redundant integrated brake master cylinder travel sensor 25 can be used as a brake pedal travel for the second pressurization device 100. Preferably, an additional brake travel or brake pedal angle detection device 110 (a brake pedal travel or brake pedal angle sensor) is provided, the signal of which is supplied to the control and regulating unit 101 via a signal line 112, and used or evaluated thereby. The brake pedal travel or brake pedal angle detection device is advantageously supplied with power by the second electronic control and regulating unit 101.

The wheel brakes are released by releasing the brake pedal 1. The surplus pressure medium volume will here flow out in the blow hole position (stud braking behavior on release).

The second pressurization device 100 is preferably controlled such that the pressure medium volume is increased until a specific pressure $P^{act}_{HZ}$ is set at a specific brake pedal position. Here again, the deceleration $a^{act}$ may be used instead of the pressure.

The first control and regulating unit 12 is advantageously connected via a communication connection 109, e.g. a data bus, to the second control and regulating unit 101. Thus the first control and regulating unit 12 can transmit a status signal to the control and regulating unit 101 which indicates whether or not the integrated brake system is available (e.g. "OK" or "not OK").

Figure 3:
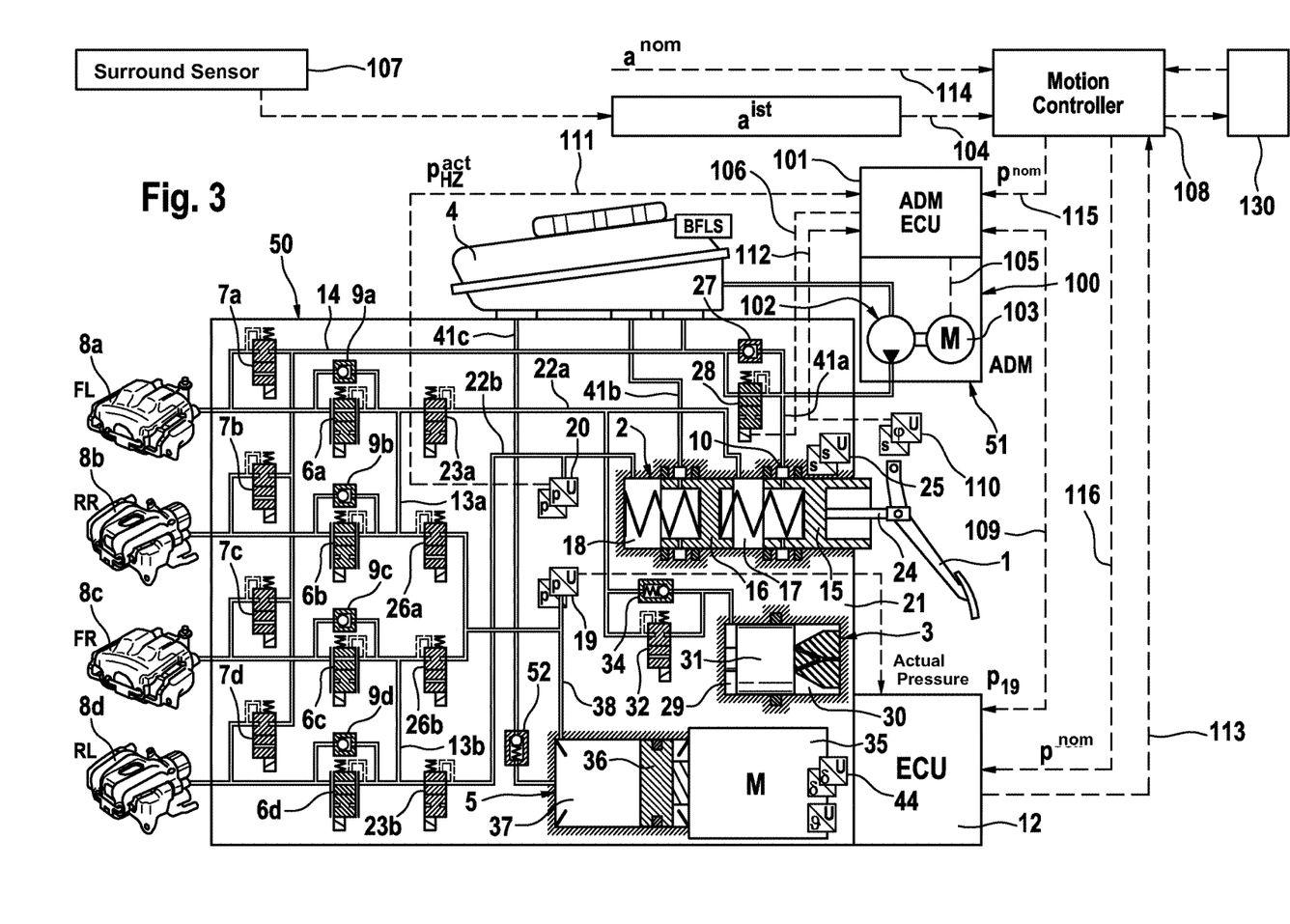
FIG. 3 shows a third exemplary embodiment of a brake system according to the invention.

FIG. 3 shows diagrammatically a third exemplary embodiment of a brake system for motor vehicles according to the invention, which substantially corresponds to the first exemplary embodiment. The third exemplary embodiment is suitable for autonomous driving. As already described with reference to the second exemplary embodiment, in the third exemplary embodiment again the diagnostic valve 28 can be controlled via a control line 106, and electric motor 103 via the control line 105, by the second electronic control and regulating unit 101. The signal (actual pressure $P^{act}_{HZ}$) of the pressure sensor 20 is also supplied to the control and regulating unit 101 via signal line 111. For example, an additional brake pedal travel or brake pedal angle sensor 110 is provided, the signal of which is supplied to the control and regulating unit 101 via signal line 112.

The control and regulating units 12 and 101 are connected together via a communication connection 109, e.g. a data bus. Via the communication connection 109, the control and regulating units exchange a status signal and a diagnostic signal.

The control and regulating unit 101 of the exemplary brake system can be controlled by a third electronic control and regulating unit, called a motion controller 108. The motion controller 108 serves to control the components of the vehicle necessary for autonomous driving, in particular the brake system, an internal combustion engine, and the steering. For this, the motion controller 108 is connected to further control units of the vehicle, for example an engine control unit 130 of the internal combustion engine and/or a surround sensor 107 and/or further sensors (e.g. wheel speed sensors etc.). An actual longitudinal acceleration signal or actual deceleration signal $a^{act}$ of the vehicle is supplied to the motion controller 108 via communication connection 104, a nominal longitudinal acceleration signal or nominal deceleration signal $a^{nom}$ of the vehicle is supplied to the motion controller 108 via communication connection 114. The nominal deceleration signal $a^{nom}$ may e.g. be supplied by a further control unit of the vehicle, the actual deceleration signal $a^{act}$ is for example obtained from a surround sensor 107 but may also be supplied by a further control unit of the vehicle or from the wheel speed sensors of the vehicle.

For example in the motion controller 108, using the deceleration signals $a^{act}$ and $a^{nom}$, a nominal value $P_{soll}$ for the brake system pressure is determined which is transmitted via the data connection 115 to the control and regulating unit 101 of the ADM and via the data connection 116 to the control and regulating unit 12 of the integrated brake system.

The first control and regulating unit 12 transmits (e.g. via a further connection 113) a status signal to the third control and regulating unit 108, indicating whether or not the integrated brake system is available.

According to the example, the pressurization device 100 is controlled by the motion controller 108 when the status signal of the first control and regulating unit 12 indicates that the first pressurization device 5 is not available.

To build up pressure by means of the second pressurization device 100, the control and regulating unit 101 controls i.e. closes the diagnostic valve 28 and the electric motor 103 drives the pump 102 so that a brake pressure is set in lines 22a, 22b and hence in the wheel brakes 8a-8d. To adjust the pressure, the signal (actual pressure $P^{act}_{HZ}$) of pressure sensor 20 or the actual deceleration signal $a^{act}$ is analyzed.

Pressure is then built up, preferably by opening the diagnostic valve 28. Particularly preferably, the diagnostic valve 28 is configured as an analog valve (not shown in FIG. 3).

If, in the first fall-back operating mode (pressure build up by means of the second pressurization device 100), the driver actuates the brake pedal 1, the pressure is only reduced completely after release of the brake pedal 1.

The function capability of the second pressurization device 100 is advantageously diagnosed by the first control and regulating unit 12 e.g. from the diagnostic signal transmitted via connection 109.

Figure 4:
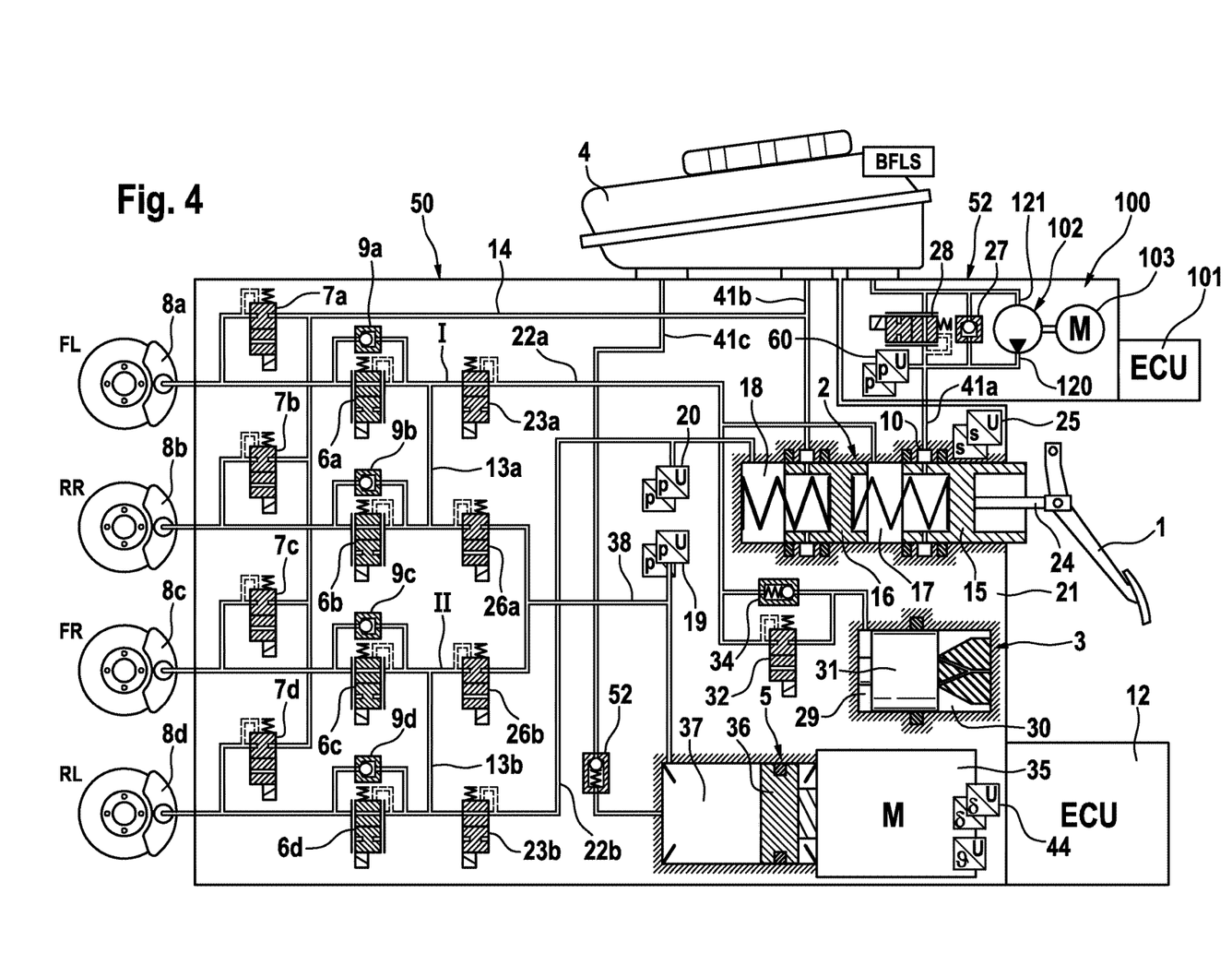
FIG. 4 shows a fourth exemplary embodiment of a brake system according to the invention.

FIG. 4 shows diagrammatically a fourth exemplary brake system. Module 50 of the integrated brake system includes the brake master cylinder 2, the pedal travel simulator 3, the pressurization device 5, valves 6a-6d, 9a-9d, 7a-7d, 23a, 23b, 26b, 32, 34, 52 and the sensors 19, 20, 25. These components have already been explained in detail in connection with FIG. 1. The allocation of wheel brakes 8a-8d to the brake circuits I, II (13a, 13b) corresponds to that of the first exemplary embodiment of FIG. 1. The brake system also includes a first electronic control and regulating unit 12 which e.g. serves to control the first pressurization device 5, the isolating valves 23a, 23b, the sequence valves 26a, 26b, the simulator release valve 32 and the inlet and outlet valves 6a-6d, 7a-7d.

The second electrically controllable pressurization device 100, which for example includes a pump 102 with an electric motor 103 for pressure generation, together with the second electronic control and regulating unit 101, is configured as an autonomous module 52 (ADM: autonomous driving module). According to the example, module 52 includes the parallel circuit of the normally open diagnostic valve 28 with the check valve 27 closing towards the pressure medium storage container 4, and an additional pressure sensor 60. The pressure balancing port 10 of pressure chamber 17 of the brake master cylinder 2 is connected via pressure balancing line 41a to the valve arrangement 28, 27 of the module 51, which in turn is connected to the pressure medium storage container 4. The pressure output port 120 of the second pressurization device 100 is connected to the pressure balancing port 10, and the suction port 121 of the pressurization device 100 is connected to the pressure medium storage container 4. The pressure sensor 60 detects the pressure at the pressure output port 120.

Valve 28 can be controlled at least by the second electronic control and regulating unit 101.

Module 52 has its own (second) electronic control and regulating unit 101 with energy and communication connection to the vehicle. Module 52 can build up brake pressure in a passive brake system (e.g. on failure of the first pressurization device 5) in that the advantageously analog valve 28 is closed and pump 102 is started. The brake pressure is reduced by the measured opening of the valve 28. The pressure sensor 60 allows pressure regulation.

Because the valve 28 is arranged in the module 52, pressure build-up is still possible on complete failure of the integrated brake system (5, 6a-6d, 7a-7d, 3, 32).

Advantageously, the suction port 121 is connected directly, i.e. without the inter-connection of a valve, to the pressure medium storage container 4.

The first control and regulating unit 12 is preferably connected via a data line or data bus (communication connection) to the second control and regulating unit 101 (not shown). Preferably, in this way the valve 28 can also be controlled by the first control and regulating unit 12.

Valve 28 thus serves as a diagnostic valve for the brake system. In order to carry out the corresponding own diagnosis, the integrated brake system (the first electronic control and regulating unit 12) asks module 52, via the communication connection, to close valve 28. After failure of the module 52, no own diagnosis is available which uses the diagnostic valve 28.

Figure 5:
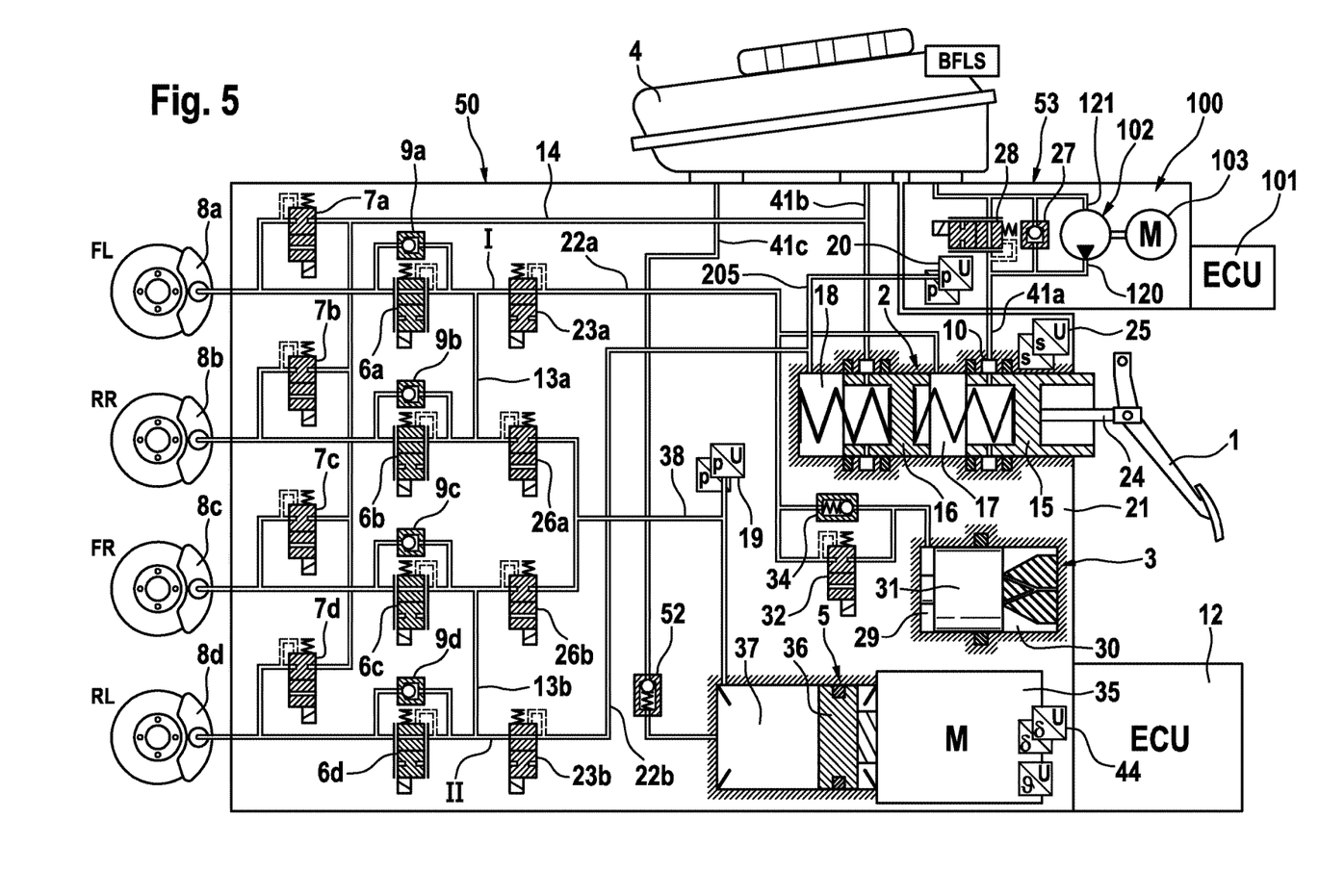
FIG. 5 shows a fifth exemplary embodiment of a brake system according to the invention.

According to the fifth exemplary embodiment of a brake system according to the invention shown in FIG. 5, the module 50 of the integrated brake system does not includes a pressure sensor 20 to detect the brake master cylinder pressure. Pressure sensor 20 is for example arranged in the autonomous module 53 which contains the second pressurization device 100, the valve arrangement 28, 27 and the second control and regulating unit 101. To detect the brake master cylinder pressure, the module 52 is therefore connected via an additional hydraulic connection 205 to the secondary pressure chamber 18 or line portion 22b. The first control and regulating unit 12 of the brake system receives the brake master cylinder pressure (from pressure sensor 20) via the communication connection from the second control and regulating unit 101. Failure of the module 52 corresponds to a failure of the diagnostic valve 28 and pressure sensor 20. This is taken into account in operation in the degradation concept of the brake system.

Figure 6:
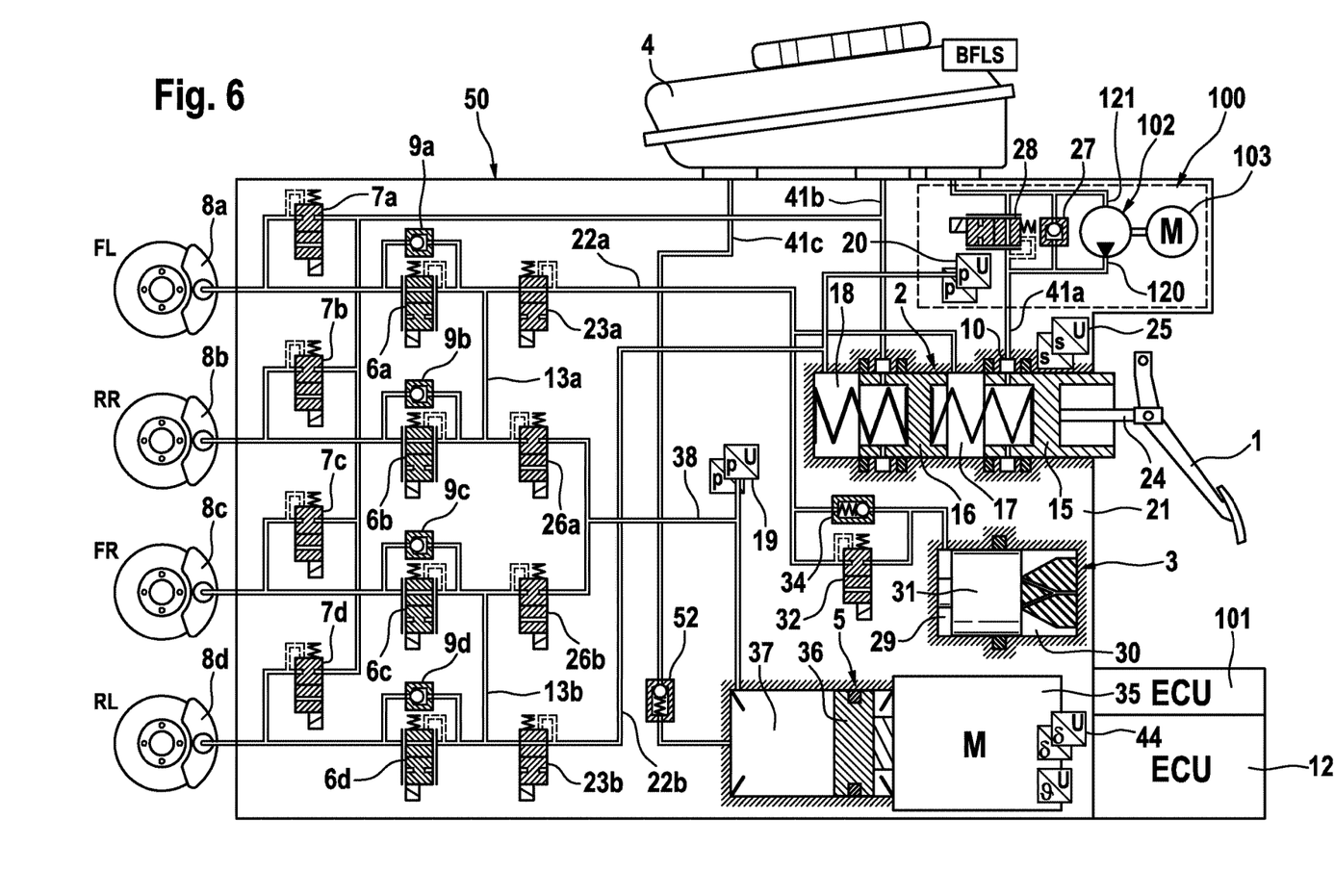
FIG. 6 shows a sixth exemplary embodiment of a brake system according to the invention.

Corresponding to the sixth exemplary embodiment of a brake system according to the invention in FIG. 6, the hydraulic module which includes the second pressurization device 100, the valve arrangement 28, 27 and the pressure sensor 20, is integrated in the hydraulic module 50 (valve support block) or housing 21 of the integrated brake system. Autonomous driving is possible here too because the valve support block is regarded as fail-safe.

In the exemplary embodiments of FIGS. 1 to 5, the module (51, 52, 53) with the second pressurization device 100 includes a separate, second control and regulating unit 101, i.e. the electronic control and regulating unit (ECU) 101 is arranged on the hydraulic control unit of the module. Alternatively it is preferred if the second control and regulating unit 101 is arranged in a housing with the first control and regulating unit 12. Such an embodiment is shown as example as in FIG. 6, but is however also possible for the other variants of FIGS. 1 to 5. Here the first control and regulating unit 12 and the second control and regulating unit 101 have separate plug connectors for energy supply and communication with the vehicle.

As a third embodiment variant of the electronic control of the module with the second pressurization device 100 (not shown), the electronics for controlling the module are integrated in the control and regulating unit 12 and also share its plug connector. Measures within the control and regulating unit ensure a sufficiently great independence, i.e. a sufficiently low probability is ensured that neither the integrated brake system (first pressurization device 5) nor the second pressurization device 100 will be able to build up brake pressure.

The data, sensor and control connections, the control system and the operating modes of the brake system, in particular with regard to autonomous driving, described with reference to FIG. 2 and FIG. 3 on the example of the brake system in FIG. 1 are preferably also implemented in the exemplary embodiments of FIGS. 4 to 6.

Preferably, the brake system is supplied with electrical energy by at least two independent energy sources, wherein a first electrical energy source supplies the first pressurization device 5 and/or the first control and regulating unit 12, and a second electrical energy source supplies the second pressurization device 100 and/or the second control and regulating unit 101. Advantageously, valves 6a-6d, 7a-7d, 23a, 23b, 26a, 26b, 32 and e.g. sensors 19, 20, 25 of the hydraulic module 50 of the integrated brake system are also supplied with electrical energy by the first energy supply device. Particularly preferably, the diagnostic valve 28 is supplied with electrical energy by the second electrical supply device, where applicable also by the first energy supply device.

While the above description constitutes the preferred embodiment of the present invention, it will be appreciated that the invention is susceptible to modification, variation and change without departing from the proper scope and fair meaning of the accompanying claims.

The invention claimed is:

1. A brake system for motor vehicles, the brake system comprising:
   a brake master cylinder which can be actuated by a brake pedal and which comprises at least one first pressure chamber, wherein the brake master cylinder is separably hydraulically connected to a plurality of wheel brakes,
   a pressure medium storage container assigned to the brake master cylinder, wherein the first pressure chamber of the brake master cylinder has a pressure balancing port for connecting to the pressure medium storage container and a first pressure chamber output port hydraulically connected to at least one of the wheel brakes, wherein the first pressure chamber output port is separate from the pressure balancing port,
   a first electrically controllable pressurization device which can be connected to the wheel brakes,
   a pressure regulating valve arrangement for regulating and controlling a wheel brake pressure that is set at the wheel brakes,
   a first electronic control and regulating unit for controlling the first pressurization device and the pressure regulating valve arrangement,
   a second electrically controllable pressurization device connected to the brake master cylinder and having a pressure output port and the second electrically controllable pressurization device is assigned to a second electronic control and regulating unit,
   wherein the first and the second pressurization devices can build up brake pressures independently of each other,
   wherein the pressure output port of the second pressurization device is connected to the pressure balancing port, wherein the second pressurization device builds up pressure in the at least one first pressure chamber via the pressure output port of the second pressurization device and the pressure balancing port,
   wherein the at least one first pressure chamber is separably hydraulically connected to at least one of the wheel brakes via the first pressure chamber output port.

2. The brake system as claimed in claim 1 further comprising in that a second valve arrangement is provided for blocking the connection between the pressure balancing port and the pressure medium storage container.

3. The brake system as claimed in claim 2 further comprising in that the second valve arrangement can be controlled by means of the second electronic control and regulating unit.

4. The brake system as claimed in claim 2 further comprising in that the pressure built up by the second pressurization device can be reduced via the second valve arrangement.

5. The brake system as claimed in claim 2 further comprising in that the second valve arrangement is configured as an analog controllable valve.

6. The brake system as claimed in claim 2 further comprising in that the second valve arrangement is arranged in an autonomous assembly with the second pressurization device.

7. The brake system as claimed in claim 1 wherein the brake master cylinder has a second pressure chamber to which a pressure sensor is connected, and an output signal of the pressure sensor is supplied to the second electronic control and regulating unit and the pressure sensor is supplied with electrical energy by the second electronic control and regulating unit.

8. The brake system as claimed in claim 7, further comprising in that the second pressurization device is configured as a hydraulic module in which the pressure sensor is integrated.

9. The brake system as claimed in claim 8, further comprising in that the brake master cylinder, the first pressurization device and the pressure regulating valve arrangement are combined in one assembly in which the hydraulic module comprising the second pressurization device is integrated.

10. The brake system as claimed in claim 9, further comprising in that the first and the second electronic control and regulating units are mechanically connected to the assembly.

11. The brake system as claimed in claim 1 wherein the second pressurization device includes the second electronic control and regulating unit.

12. The brake system as claimed in claim 1 wherein a third electronic control and regulating unit is provided which controls a task division between the first and the second electronic control and regulating units.

13. The brake system as claimed in claim 1, wherein the pressure output port of the second pressurization device is directly connected to the pressure balancing port.

14. The brake system as claimed in claim 1, further comprising a piston, the piston delimitating the first pressure chamber, wherein the first pressure chamber is hydraulically separated from the pressure balancing port when the piston is moved from a first position to a second position.

* * * * *